US012676093B2

(12) United States Patent
Dong et al.

(10) Patent No.: US 12,676,093 B2
(45) Date of Patent: Jul. 7, 2026

(54) FROZEN SCREEN DETECTION METHOD AND APPARATUS, ELECTRONIC DEVICE, AND VEHICLE

(71) Applicant: BYD COMPANY LIMITED, Shenzhen (CN)

(72) Inventors: Xiaofei Dong, Shenzhen (CN); Jiahu Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 18/930,912

(22) Filed: Oct. 29, 2024

(65) Prior Publication Data

US 2025/0054427 A1 Feb. 13, 2025

Related U.S. Application Data

(63) Continuation of application No. PCT/CN2023/089689, filed on Apr. 21, 2023.

(30) Foreign Application Priority Data

May 10, 2022 (CN) .......................... 202210508705.9

(51) Int. Cl.
 *G09G 3/00* (2006.01)
 *G06T 7/00* (2017.01)
(52) U.S. Cl.
 CPC ........... *G09G 3/006* (2013.01); *G06T 7/0002* (2013.01); *G06T 2207/10016* (2013.01); *G09G 2380/10* (2013.01)

(58) Field of Classification Search
 CPC .. G09G 3/006; G09G 2380/10; G06T 7/0002; G06T 2207/10016
 See application file for complete search history.

(56) References Cited

U.S. PATENT DOCUMENTS

| | | | | |
|---|---|---|---|---|
| 2011/0286531 A1* | 11/2011 | Okajima | ................ | H04N 19/61 |
| | | | | 375/E7.279 |
| 2022/0415038 A1 | 12/2022 | Ren | | |
| 2023/0237941 A1* | 7/2023 | Jeong | .................... | G09G 5/003 |
| | | | | 345/204 |
| 2024/0296764 A1* | 9/2024 | Wang | .................... | G09G 3/006 |

FOREIGN PATENT DOCUMENTS

| | | |
|---|---|---|
| CN | 108608863 A | 10/2018 |
| CN | 105675038 B | 12/2019 |
| CN | 112109549 A | 12/2020 |
| CN | 113632028 A | 11/2021 |

(Continued)

OTHER PUBLICATIONS

International Search Report and Written Opinion for Application No. PCT/CN2023/089689, mailed on Aug. 2, 2023, 9 pages.

(Continued)

*Primary Examiner* — Hang Lin

(74) *Attorney, Agent, or Firm* — Sheppard Mullin Richter & Hampton LLP

(57) ABSTRACT

A method for detecting a frozen screen, includes monitoring a change of a pixel in a video signal outputted to a display screen, and determining whether the display screen is frozen according to the change of the pixel and the policy. The pixel changes based on a policy when the display screen is not frozen.

19 Claims, 3 Drawing Sheets

(56) References Cited

FOREIGN PATENT DOCUMENTS

| | | | |
|---|---|---|---|
| CN | 113959476 | A | 1/2022 |
| EP | 2254039 | A1 | 11/2010 |
| JP | 2017-208750 | A | 11/2017 |
| JP | 2018-079839 | A | 5/2018 |
| JP | 2020-123950 | A | 8/2020 |
| KR | 102153718 | B1 | 9/2020 |
| WO | 2022/062772 | A1 | 3/2022 |

OTHER PUBLICATIONS

Notice of Reasons for Refusal dated Oct. 31, 2025, issued in Japanese Patent Application No. 2024-563986, with English machine translation (9 pages).
Extended European Search Report dated Nov. 21, 2025, issued in European Patent Application No. 23802613.2 (15 pages).

* cited by examiner

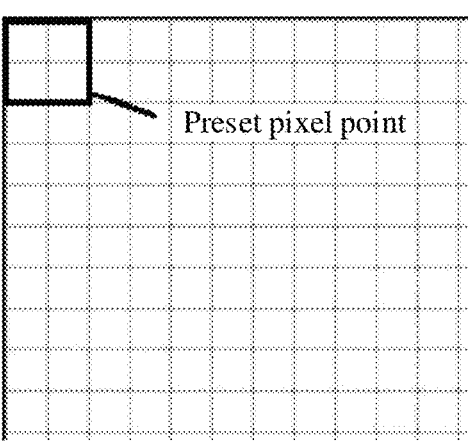

Preset pixel point

FIG. 3

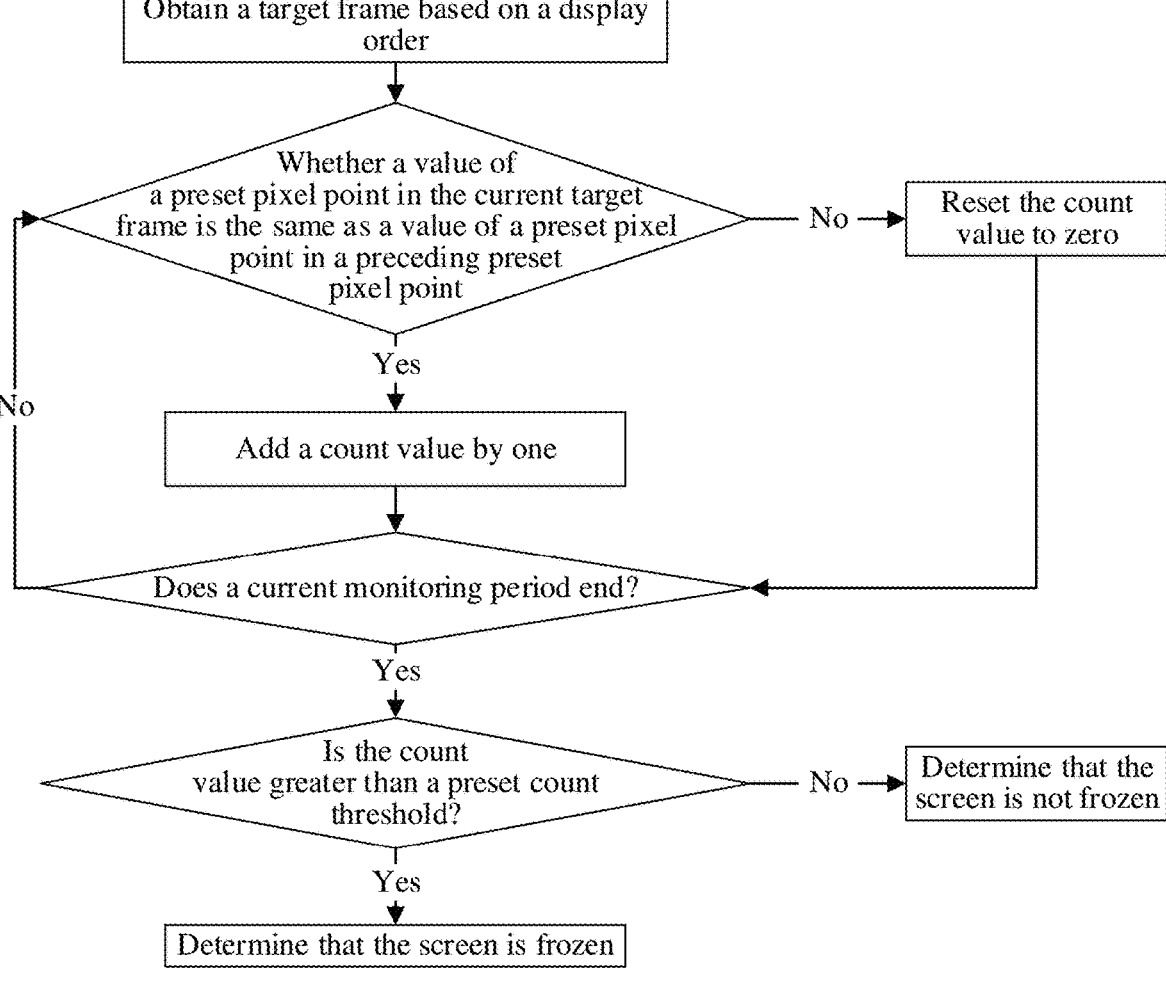

Obtain a target frame based on a display order

Whether a value of a preset pixel point in the current target frame is the same as a value of a preset pixel point in a preceding preset pixel point No → Reset the count value to zero Yes Add a count value by one Does a current monitoring period end?

No

Yes

Is the count value greater than a preset count threshold?

No → Determine that the screen is not frozen

Yes

Determine that the screen is frozen

FIG. 4

FROZEN SCREEN DETECTION METHOD AND APPARATUS, ELECTRONIC DEVICE, AND VEHICLE

CROSS-REFERENCE TO RELATED APPLICATIONS

This application is a continuation application of International Patent Application No. PCT/CN2023/089689, filed on Apr. 21, 2023, which is based on and claims priority to and benefits of Chinese Patent Application No. 202210508705.9, filed on May 10, 2022. The entire content of all of the above-referenced applications is incorporated herein by reference.

FIELD

The present disclosure relates to the field of display device technologies, and more particularly, to a frozen screen detection method and apparatus, an electronic device, a vehicle, and a non-transitory computer-readable storage medium.

BACKGROUND

Frozen screen is one of the common malfunctions of a display device. Frozen screen of a display device often brings a bad experience to a user and may even endanger personal safety of the user. For example, frozen screen of an instrument on a vehicle hinders a driver from obtaining traveling information, which may cause the driver to engage in some dangerous driving behaviors. In the related art, an additional camera is usually used to capture a picture of a display device for frozen screen detection. If the captured picture is inconsistent with a picture that should be displayed by the display device, it is considered that the display device is frozen. However, the additional camera may increase costs.

SUMMARY

In view of this, the present disclosure provides a frozen screen detection method and apparatus, an electronic device, a vehicle, and a non-transitory computer-readable storage medium, which can achieve frozen screen detection on a display device without adding an additional camera, thereby effectively reducing costs.

According to a first aspect, the present disclosure provides a frozen screen detection method, including:

monitoring a change of a pixel in a video signal outputted to a display screen, where pixel changes based on a policy when the display screen is not frozen; and determining whether the display screen is frozen according to the change of the pixel and the policy.

In an embodiment, the determining, according to the change of the pixel and the policy, whether the display screen is frozen includes:

determining whether the change of the pixel complies with the policy;

in response to that the change of the pixel complies with the policy, determining that the display screen is not frozen; and in response to that the change of the pixel does not comply with the policy, determining that the display screen is frozen.

In an embodiment, the policy is that a pixel value of a pixel in a plurality of target frames of the video signal changes, and that the pixel has different pixel values in two adjacent target frames;

the monitoring a change of a pixel in a video signal outputted to a display screen includes:

monitoring a change of the pixel value of the pixel in the plurality of target frames; and the determining whether the change of the pixel complies with the policy includes:

determining whether the change of the pixel value of the pixel in the target frames complies with the policy.

In an embodiment, the monitoring a change of the pixel value of the pixel in the plurality of target frames includes:

detecting, based on a display order of the target frames, whether a pixel value of the pixel in a current target frame of the target frames of the video signal is the same as a pixel value of the pixel in a preceding target frame of the target frames;

in response to that the pixel value of the pixel in the current target frame of the target frames of the video signal is the same as the pixel value of the pixel in the preceding target frame of the target frames, increasing a count value by one; and in response to that the pixel value of the pixel in the current target frame of the target frames of the video signal and the pixel value of the pixel in the preceding target frames of the target frames are different, resetting the count value to zero; and the determining whether the change of the pixel value of the pixel in the target frames complies with the policy includes:

determining whether the count value is greater than a count threshold;

in response to that the count value is greater than the count threshold, determining that the change of the pixel value of the pixel in the target frames does not comply with the policy; and in response to that the count value is less than or equal to the count threshold, determining that the change of the pixel value of the pixel in the target frames complies with the policy.

In an embodiment, the detecting, based on a display order of the target frames, whether a pixel value of the pixel in a current target frame of the target frames of the video signal is the same as a pixel value of the pixel in a preceding target frame of the target frames includes:

obtaining a cyclic redundancy check code of the pixel in the current target frame based on the display order of the target frames;

in response to that the cyclic redundancy check code of the pixel in the current target frame is the same as a cyclic redundancy check code of the pixel in the preceding target frame, determining that a pixel value of the pixel in the current target frame is the same as the pixel value of the pixel in the preceding target frame; and in response to that the cyclic redundancy check code of the pixel in the current target frame is different from the cyclic redundancy check code of the pixel in the preceding target frame, determining that the pixel value of the pixel in the current target frame is different from the pixel value of the pixel in the preceding target frame.

In an embodiment, the video signal is a video signal outputted to the display screen in a monitoring period, and each of the target frames is a frame in the video signal, or the target frames are frames sampled in the video signal spaced apart by a certain number of frames, or the target frames are a plurality of consecutive frames in the video signal.

In an embodiment, the determining, according to the change of the pixel and the policy, whether the display screen is frozen includes:

determining whether the change of the pixel complies with the policy;

in response to that the change of the pixel complies with the policy, determining that the display screen is not frozen;

in response to that the change of the pixel does not comply with the policy, selecting at least two detection frames from the video signal;

determining whether the detection frames are the same;

in response to that the at least two detection frames are the same, determining that the display screen is frozen; and in response to that the at least two detection frames are different, determining that the display screen is not frozen.

In an embodiment, the frozen screen detection method further includes:

in response to determining that the display screen is frozen, clearing a residual picture on the display screen, and controlling the display screen to display a backup picture.

In an embodiment, the display screen is a vehicle instrument screen, the monitoring a change of a pixel in a video signal outputted to a display screen includes:

in response to receiving traveling information to be displayed on the vehicle instrument screen, determining whether a video signal outputted to the vehicle instrument screen exists; and in response to that the video signal outputted to the vehicle instrument screen exists, monitoring a change of a pixel in the video signal outputted to the vehicle instrument screen.

In an embodiment, the frozen screen detection method further includes:

in response to that the video signal outputted to the vehicle instrument screen does not exist, controlling the vehicle instrument screen to display the traveling information and a backup picture.

According to a second aspect, the present disclosure provides a frozen screen detection apparatus, including:

a monitoring unit, configured to monitor a change of a pixel in a video signal outputted to a display screen, where the pixel changes based on a policy when the display screen is not frozen; and a determining unit, configured to determine whether the display screen is frozen according to the change of the pixel and the policy.

According to a third aspect, the present disclosure provides an electronic device. The electronic device includes a memory, a processor, and a computer program stored in the memory and executable on the processor. The processor, when executing the computer program, implements the method according to the first aspect.

According to a fourth aspect, the present disclosure provides a non-transitory computer-readable storage medium, storing a computer program. The computer program, when executed by a processor, to cause the processor to implement the method according to the first aspect.

According to a fifth aspect, the present disclosure provides a vehicle, including the electronic device according to the third aspect.

It can be learned from the foregoing that, in the solutions of the present disclosure, when a display screen is not frozen, a preset pixel in a video signal outputted to the display screen changes based on a preset policy. By monitoring a change of the preset pixel in the video signal, and comparing the change with the preset policy, whether the display screen is currently frozen can be determined. In the solutions of the present disclosure, frozen screen detection can be achieved on the display screen without adding an additional camera, thereby effectively reducing costs.

It can be understood that, for beneficial effects of the second aspect to the fifth aspect, reference can be made to related descriptions in the first aspect. Details are not described herein.

BRIEF DESCRIPTION OF THE DRAWINGS

To describe the technical solutions in embodiments of the present disclosure more clearly, the following briefly describes the accompanying drawings required for describing the embodiments or the related art. Apparently, the accompanying drawings in the following description show merely some embodiments of the present disclosure, and a person of ordinary skill in the art may derive other drawings from these accompanying drawings without creative efforts.

FIG. 3 is a schematic diagram of a preset pixel according to an embodiment of the present disclosure;

FIG. 4 is a schematic diagram of a counting process of a frozen screen detection method according to an embodiment of the present disclosure.

DETAILED DESCRIPTION

In the following description, for the purpose of illustration rather than limitation, details such as the system structure and technology are proposed to thoroughly understand embodiments of the present disclosure. However, a person skilled in the art should know that the present disclosure may be practiced in other embodiments without these details. In other cases, detailed descriptions of well-known systems, apparatuses, circuits, and methods are omitted to avoid unnecessary details hindering the description of the present disclosure.

Frozen screen means that a picture is frozen and no longer changes. The rapid development of full digital instruments in the vehicle field also brings a problem of frozen screen of instruments to major vehicle companies. Frozen screen of an instrument on a vehicle hinders a driver from obtaining traveling information, which may cause the driver to engage in some dangerous driving behaviors. For example, after the instrument is frozen, the driver cannot obtain a current vehicle speed. In a case that the current vehicle speed is speeding up, the driver chooses to continue to deeply step on a throttle for acceleration. To ensure driving safety, the full digital instrument needs to detect stability of a display picture of the full digital instrument in real time. In the related art, an additional camera is usually used to capture a picture of a display device for frozen screen detection. If the captured picture is inconsistent with a picture that should be displayed by the display device, it is considered that the display device is frozen. However, the additional camera undoubtedly increases extra costs. Based on this, the embodiments of the present disclosure provide a frozen screen detection method and apparatus, an electronic device, a vehicle, and a computer-readable storage medium. When a display screen is not frozen, a preset pixel in a video signal outputted to the display screen changes based on a preset policy. By monitoring a change of the preset pixel in the video signal, and comparing the change with the preset policy, whether the display screen is currently frozen can be determined. In the solutions of the present disclosure, frozen screen detection can be achieved on the display screen without adding an additional camera, thereby effectively reducing costs. The technical solutions in the embodiments of the present disclosure are described below by using embodiments.

Figure 1:
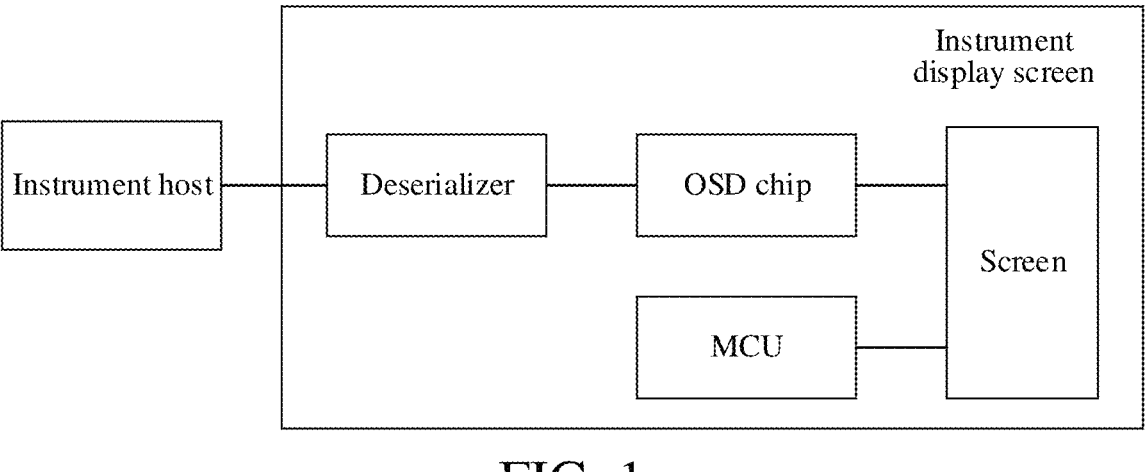
FIG. 1 is a schematic diagram of an implementation environment of a frozen screen detection method according to an embodiment of the present disclosure.

An implementation environment of a frozen screen detection method according to an embodiment of the present disclosure is described below. Referring to FIG. 1, an implementation environment includes an instrument host and an instrument display screen.

The instrument display screen includes a deserializer, an on-screen display (OSD) chip, a microcontroller unit (MCU), and a screen. The instrument host outputs a video signal that needs to be displayed. After being processed by the deserializer and the OSD chip, the video signal is outputted to the screen for display. The MCU is connected to the OSD chip and the screen respectively to control the OSD chip and the screen respectively.

Figure 2:
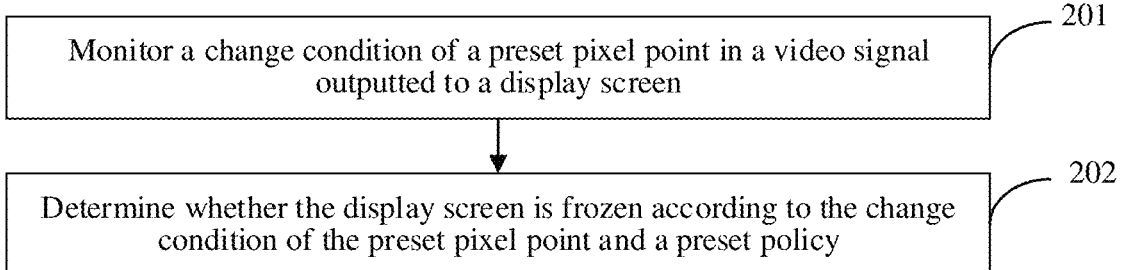
FIG. 2 is a schematic flowchart of a frozen screen detection method according to an embodiment of the present disclosure.

A frozen screen detection method according to an embodiment of the present disclosure is described below. Referring to FIG. 2, the frozen screen detection method may be applied to the MCU in FIG. 1. The method includes the following steps.

Step 201: Monitor a change of a preset pixel in a video signal outputted to a display screen.

Step 202: Determine whether the display screen is frozen according to the change of the preset pixel and a preset policy.

In this embodiment of the present disclosure, multiple frames of the video signal are sequentially outputted to the display screen for display. Each frame of the video signal is formed by multiple pixels. The preset pixel may be any one or more pixels in each frame of the video signal. This is not limited herein. For example, to minimize the impact on a viewing experience of a user, the preset pixel may be selected from regions less noticeable to the user. For example, the preset pixel may be four pixels in a 2*2 pixel region in an upper left corner in each frame of the video signal. Since each video signal outputted to the display screen is processed by the OSD chip, the MCU can monitor the change of the preset pixel in the video signal through the OSD chip. Through presetting, the preset pixel changes in different frames of the video signal based on the preset policy. Referring to FIG. 3, FIG. 3 shows a video signal. Each grid represents a pixel. Using an example in which the preset pixel is four pixels in a 2*2 pixel region in an upper left corner in each frame of the video signal, the MCU can monitor a change of the four pixels in the upper left corner in different frames of the video signal through the OSD.

Since in the presetting, if the display screen is not frozen, the preset pixel in the video signal should change based on the preset policy. Therefore, by monitoring an actual change of the preset pixel in the video signal, and comparing the actual change of the preset pixel with the preset policy, whether the display screen is frozen can be determined.

For example, in this embodiment of the present disclosure, a monitoring period may be set, and the MCU may monitor a change of a preset pixel in a video signal outputted to the display screen in a current monitoring period. Then, at an end moment of the current monitoring period, whether the display screen is frozen in the current monitoring period is determined according to the change of the preset pixel and the preset policy. Next, the MCU may monitor a change of a preset pixel in a video signal outputted to the display screen in a next monitoring period, and determine whether the display screen is frozen in the next monitoring period at an end moment of the next monitoring period according to the change of the preset pixel and the preset policy, and so on. In this way, frozen screen detection can be achieved on the display screen without adding an additional camera. In addition, a calculation amount of frozen screen detection can also be greatly reduced since the MCU monitors only changes of some pixels (that is, the preset pixel) in the video signal instead of monitoring all pixels in the video signal.

In some embodiments, the foregoing step 202 includes:

A1: Determine whether the change of the preset pixel complies with the preset policy.

A2: Determine that the display screen is not frozen if the change of the preset pixel complies with the preset policy.

A3: Determine that the display screen is frozen if the change of the preset pixel does not comply with the preset policy.

The preset policy may be set according to a requirement, and the preset policy is not limited in the embodiments of the present disclosure. The preset pixel always changes based on the preset policy in a case that the display screen is not frozen. Therefore, if the change of the preset pixel complies with the preset policy, it may be determined that the display screen is not frozen. Conversely, if the change of the preset pixel does not comply with the preset policy, it may be determined that the display screen is frozen. In an embodiment, in a case that the display screen is frozen, the preset pixel in multiple frames of the video signal remains unchanged. Therefore, the monitored change of the preset pixel needs to not comply with the preset policy. In this way, whether the display screen is frozen can be quickly determined.

In some embodiments, the preset policy may be that a pixel value of the preset pixel in multiple target frames of the video signal changes, where the preset pixel has different pixel values in any two adjacent target frames. The adjacent target frames are two target frames with closest display time. The target frame may be selected from all frames in the video signal, and the selected frame is used as the target frame. Based on this, the foregoing step 201 includes:

monitoring a change of the pixel value of the preset pixel in the multiple target frames.

The foregoing step A1 includes:

determining whether the change of the pixel value of the preset pixel in the multiple target frames complies with the preset policy.

In this embodiment of the present disclosure, when the display screen is not frozen, the pixel value of the preset pixel changes in the multiple target frames of the video signal. For example, the target frame may be a frame selected every two frames in all frames of the video signal. For any target frame, the pixel value of the preset pixel in the target frame is different from pixel values of a preset pixel in a target frame preceding the target frame and a target frame succeeding the target frame. If the preset pixel has the same pixel value in any two adjacent target frames, the display screen may be frozen. For example, it is assumed that the video signal includes a frame 1, a frame 2, a frame 3, a frame 4, a frame 5, a frame 6, and a frame 7 in a display order. The frame 1, the frame 4, and the frame 7 are selected as target frames. A pixel value of a preset pixel in the frame 1 is X1, a pixel value of a preset pixel in the frame 4 is X2, and a pixel value of a preset pixel in the frame 7 is X1. In this way, it can be ensured that the preset pixel has different pixel values in two adjacent target frames. It should be noted that when the display screen is not frozen, if there are multiple preset pixels, the preset pixels in two adjacent target frames respectively correspond to different pixel values. For example, it is assumed that the preset pixel includes a pixel 1 and a pixel 2. When the display screen is not frozen, the pixel 1 has different pixel values in two adjacent target frames, and the pixel 2 has different pixel values in two adjacent target frames. The pixel 1 and the pixel 2 may have the same or different pixel values. This is not limited herein.

In some embodiments, the monitoring a change of the pixel value of the preset pixel in the multiple target frames includes:

sequentially detecting, based on a display order of the target frames, whether the pixel value of the preset pixel in a current target frame of the target frames of the video signal is the same as a pixel value of a preset pixel in a preceding target frame of the target frames;

adding a count value by one if the pixel values are the same; and resetting the count value to zero if the pixel values are different.

The determining whether the change of the pixel value of the preset pixel in the multiple target frames complies with the preset policy includes:

determining whether the count value is greater than a preset count threshold;

determining that the change of the pixel value of the preset pixel in the multiple target frames does not comply with the preset policy if the count value is greater than the count threshold; and determining that the change of the pixel value of the preset pixel in the multiple target frames complies with the preset policy if the count value is less than or equal to the count threshold.

The target frames have a display order, and whether the pixel value of the preset pixel in each target frame of the video signal is the same as a pixel value of a preset pixel in a target frame preceding the target frame is sequentially detected based on the display order. In an embodiment, referring to FIG. 4, in the current monitoring period, the target frames may be sequentially obtained based on the display order of the target frames. For a currently obtained current target frame, the MCU may detect whether a pixel value of a preset pixel in the current target frame is the same as a pixel value of a preset pixel in a target frame preceding the current target frame. The count value may be added by one if the pixel values are the same, and the count value is reset to zero if the pixel values are different. After the count value is added by one or reset to zero, the MCU may determine whether the current monitoring period ends. If the current monitoring period ends, the MCU may determine whether the count value is greater than the preset count threshold. If the count value is greater than the count threshold, it is determined that the change of the pixel value of the preset pixel in the multiple target frames do not comply with the preset policy. In this case, it may be determined that the display screen is frozen. If the count value is less than or equal to the count threshold, it is determined that the change of the pixel value of the preset pixel in the multiple target frames complies with the preset policy. In this case, it may be determined that the display screen is not frozen. It should be noted that in this embodiment of the present disclosure, every 100 milliseconds may be recorded as a monitoring period, and the current monitoring period is a monitoring period to which a current moment belongs. The MCU may determine whether the display screen is frozen at the end of each monitoring period. When the current monitoring period ends and a next monitoring period starts, the count value is also reset to zero. That is, the steps shown in FIG. 4 are only performed by the MCU in a monitoring period. The MCU performs the steps shown in FIG. 4 once in each monitoring period. In this way, the frozen screen detection method in the embodiments of the present disclosure can be simplified, and a calculation amount of the MCU can be reduced.

In an embodiment, the sequentially detecting, based on a display order of the target frames, whether the pixel value of the preset pixel in a current target frame of the target frames of the video signal is the same as a pixel value of a preset pixel in a preceding target frame of the target frames includes:

obtaining a cyclic redundancy check code of a preset pixel in a current target frame based on the display order of the target frames;

determining that a pixel value of the preset pixel in the current target frame is the same as the pixel value of the preset pixel in the preceding target frame if the cyclic redundancy check code of the preset pixel in the current target frame is the same as a cyclic redundancy check code of the preset pixel in the preceding target frame; and determining that the pixel value of the preset pixel in the current target frame is different from the pixel value of the preset pixel in the preceding target frame if the cyclic redundancy check code of the preset pixel in the current target frame is different from the cyclic redundancy check code of the preset pixel in the preceding target frame.

In the embodiments of the present disclosure, for each target frame except for the first target frame of the video signal, whether the pixel value of the preset pixel in the target frame is the same as the preset pixel in the target frame preceding the target frame is sequentially detected. The current target frame is a target frame that needs to be currently detected. The MCU may obtain the cyclic redundancy check (CRC) code of the preset pixel in the current target frame. In an embodiment, the CRC of the preset pixel may be calculated by the OSD chip, and then the MCU obtains the CRC of the preset pixel from the OSD chip.

If the CRC of the preset pixel in the current target frame is the same as the CRC of the preset pixel in the preceding target frame, it may be determined that the pixel value of the preset pixel in the current target frame is the same as the pixel value of the preset pixel in the preceding target frame. Otherwise, it may be determined that the pixel value of the preset pixel in the current target frame is different from the preset pixel in the preceding target frame.

In some embodiments, to obtain a more accurate frozen screen detection result, the target frame may be each frame of the video signal. In other words, if the video signal includes a frame 1, a frame 2, a frame 3, a frame 4, and a frame 5, the target frames are the frame 1, the frame 2, the frame 3, the frame 4, and the frame 5. The video signal is a video signal outputted to the display screen in a monitoring period.

In some other embodiments, to reduce the calculation amount of the MCU, the target frames may be sampled in the video signal spaced apart by a preset quantity of frames. In other words, if the video signal includes a frame 1, a frame 2, a frame 3, a frame 4, and a frame 5, and the preset quantity is 1, the target frames may be the frame 1, the frame 3, and the frame 5. The video signal is a video signal outputted to the display screen in a monitoring period.

In still some other embodiments, to reduce the calculation amount of the MCU, the target frames may be consecutive frames selected in the video signal. In other words, if the video signal includes a frame 1, a frame 2, a frame 3, a frame 4, and a frame 5, the target frames may be the frame 3, the frame 4, and the frame 5. The video signal is a video signal outputted to the display screen in a monitoring period.

In some embodiments, the foregoing step 202 includes:

determining whether the change of the preset pixel complies with the preset policy;

determining that the display screen is not frozen if the change of the preset pixel complies with the preset policy;

selecting at least two detection frames from the video signal if the change of the preset pixel does not comply with the preset policy;

determining whether the detection frames are the same;

determining that the display screen is frozen if the detection frames are the same; and determining that the display screen is not frozen if any two detection frames are different.

The detection frame may be at least any two frames in the video signal. If the change of the preset pixel does not comply with the preset policy, to obtain a more accurate frozen screen detection result, the MCU may determine whether the detection frames are the same. In an embodiment, assuming that every two detection frames are a detection frame 1 and a detection frame 2, the MCU may determine whether all pixels of the detection frame 1 correspond to all pixels of the detection frame 2. If all pixels of the detection frame 1 correspond to all pixels of the detection frame 2, it is determined that the detection frame 1 is the same as the detection frame 2, and if all pixels of the detection frame 1 do not correspond to all pixels of the detection frame 2, it is determined that the detection frame 1 is different from the detection frame 2. In an embodiment, the MCU may obtain a CRC of the detection frame 1 and a CRC of the detection frame 2. If the two CRCs are the same, it is determined that all pixels of the detection frame 1 correspond to all pixels of the detection frame 2. The CRC may be calculated by the OSD chip, and the MCU may obtain the CRC from the OSD chip. If the detection frames are the same, it may be determined that the display screen is frozen. If any two of all detection frames are different, it is determined that the display screen is not frozen.

In an embodiment, the frozen screen detection method in this embodiment of the present disclosure further includes:

clearing a residual picture on the display screen when determining that the display screen is frozen, and controlling the display screen to display a backup picture.

In this embodiment of the present disclosure, if it is determined that the display screen is frozen, the MCU may control the OSD chip to clear the residual picture on the display screen, and may control the OSD chip to mask the video signal outputted by the instrument host in FIG. 1, to output a backup picture file locally stored in the OSD chip. In this way, the user can still obtain required information from the display screen when the display screen is frozen. In an embodiment, the backup picture file may be stored in the MCU. The MCU transmits the backup picture file to the OSD chip, and controls the OSD chip to display the backup picture. In an embodiment, the backup picture file may be stored in the OSD chip and the MCU separately, to resolve a problem of insufficient storage space of the OSD chip and the MCU.

In some embodiments, the display screen is a vehicle instrument screen, and the foregoing step 201 includes:

determining whether a video signal outputted to the vehicle instrument screen exists when receiving traveling information that needs to be displayed on the vehicle instrument screen; and monitoring a change of a preset pixel in the video signal outputted to the vehicle instrument screen if the video signal outputted to the vehicle instrument screen exists.

The traveling information includes, but is not limited to, a vehicle speed, a rotation speed, and turn signal information. Generally, when the vehicle is unlocked, an instrument should start to operate. In this case, the MCU may receive traveling information from a controller area network (CAN) bus, and the traveling information needs to be displayed on the vehicle instrument screen. Therefore, when receiving the traveling information, the MCU may determine whether the video signal outputted to the vehicle instrument screen exists. If the video signal outputted to the vehicle instrument screen exists, the MCU may start frozen screen detection. In an embodiment, if the video signal outputted to the vehicle instrument screen exits, the MCU may perform the foregoing steps 201 and 202 once in each monitoring period.

In an embodiment, based on the previous embodiment, the frozen screen detection method in this embodiment of the present disclosure further includes:

controlling the vehicle instrument screen to display the traveling information and the backup picture if the video signal outputted to the vehicle instrument screen does not exist.

In this embodiment of the present disclosure, when receiving the traveling information that needs to be displayed on the vehicle instrument screen, if no video signal outputted to the vehicle instrument screen exists, to ensure display stability of the vehicle instrument screen, the MCU may send the received traveling information to the OSD chip. The OSD chip combines the backup picture stored in the OSD chip and the traveling information in a preset manner and outputs the combined information to the vehicle instrument screen, to cause the vehicle instrument screen to display the traveling information and the backup picture.

It can be learned from the foregoing that, in the solutions of the present disclosure, when a display screen is not frozen, a preset pixel in a video signal outputted to the display screen changes based on a preset policy. By monitoring a change of the preset pixel in the video signal, and comparing the change with the preset policy, whether the display screen is currently frozen can be determined. In the solutions of the present disclosure, frozen screen detection can be achieved on the display screen without adding an additional camera, thereby effectively reducing costs.

Figure 5:
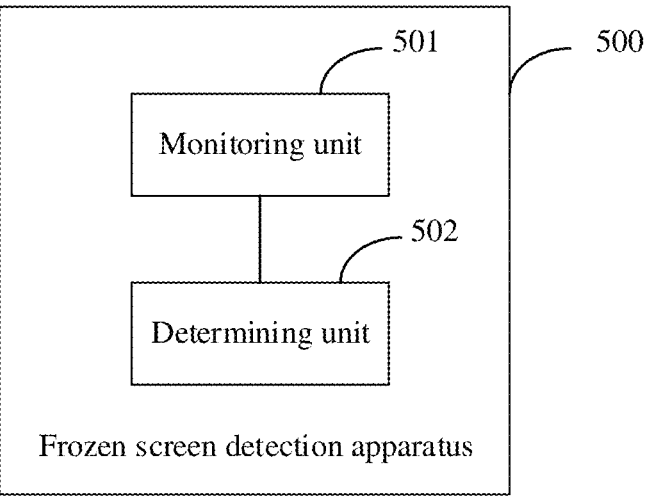
FIG. 5 is a schematic diagram of a structure of a frozen screen detection apparatus according to an embodiment of the present disclosure.

Corresponding to the frozen screen detection method provided above, an embodiment of the present disclosure further provides a frozen screen detection apparatus. As shown in FIG. 5, the frozen screen detection apparatus 500 in this embodiment of the present disclosure includes:

a monitoring unit 501, configured to monitor a change of a preset pixel in a video signal outputted to a display screen, where the preset pixel changes based on a preset policy when the display screen is not frozen; and a determining unit 502, configured to determine whether the display screen is frozen according to the change of the preset pixel and the preset policy.

In an embodiment, the determining unit 502 includes:

a first judgment subunit, configured to determine whether the change of the preset pixel complies with the preset policy;

a first determining subunit, configured to determine that the display screen is not frozen if the change of the preset pixel complies with the preset policy; and a second determining subunit, configured to determine that the display screen is frozen if the change of the preset pixel does not comply with the preset policy.

In an embodiment, the preset policy is that a pixel value of the preset pixel changes in multiple target frames of the video signal, where the preset pixel has different pixel values in any two adjacent target frames. The monitoring unit 501 is configured to monitor a change of the pixel value of the preset pixel in the multiple target frames. The first judgment subunit is configured to determine whether the change of the pixel value of the preset pixel in the multiple target frames complies with the preset policy.

In an embodiment, the monitoring unit 501 is configured to sequentially detect, based on a display order of the target frames, whether the pixel value of the preset pixel in a current target frame of the target frames of the video signal is the same as a pixel value of a preset pixel in a preceding target frame; add a count value by one if the pixel values are the same; and reset the count value to zero if the pixel values are different. The first judgment subunit is configured to determine whether the count value is greater than a preset count threshold; determine that the change of the pixel value of the preset pixel in the multiple target frames does not comply with the preset policy if the count value is greater than the count threshold; and determine that the change of the pixel value of the preset pixel in the multiple target frames complies with the preset policy if the count value is less than or equal to the count threshold.

In an embodiment, the monitoring unit 501 is configured to obtain a cyclic redundancy check code of a preset pixel in a current target frame based on the display order of the target frames; determine that a pixel value of the preset pixel in the current target frame is the same as the pixel value of the preset pixel in the preceding target frame if the cyclic redundancy check code of the preset pixel in the current target frame is the same as a cyclic redundancy check code of the preset pixel in the preceding target frame; and determine that the pixel value of the preset pixel in the current target frame is different from the pixel value of the preset pixel in the preceding target frame if the cyclic redundancy check code of the preset pixel in the current target frame is different from the cyclic redundancy check code of the preset pixel in the preceding target frame.

In an embodiment, the video signal is a video signal outputted to the display screen in a monitoring period, and the target frame is each frame in the video signal, or the target frames are sampled in the video signal spaced apart by a certain number of frames, or the target frames are multiple consecutive frames selected in the video signal.

In an embodiment, the determining unit 502 includes:

a second judgment subunit, configured to determine whether the change of the preset pixel complies with the preset policy;

a third determining subunit, configured to determine that the display screen is not frozen if the change of the preset pixel complies with the preset policy;

a detection frame selection subunit, configured to select at least two detection frames from the video signal if the change of the preset pixel does not comply with the preset policy;

a third judgment subunit, configured to determine whether the detection frames are the same;

a fourth determining subunit, configured to determine that the display screen is frozen if the detection frames are the same; and a fifth determining subunit, configured to determine that the display screen is not frozen if any two detection frames are different.

In an embodiment, the frozen screen detection apparatus 500 further includes:

a frozen screen processing unit, configured to clear a residual picture on the display screen when it is determined that the display screen is frozen, and control the display screen to display a backup picture.

In an embodiment, the display screen is a vehicle instrument screen, and the monitoring unit 501 is further configured to determine whether a video signal outputted to the vehicle instrument screen exists when traveling information that needs to be displayed on the vehicle instrument screen is received; and monitor a change of a preset pixel in the video signal outputted to the vehicle instrument screen if the video signal outputted to the vehicle instrument screen exists.

In an embodiment, the frozen screen detection apparatus 500 further includes:

a backup display unit, configured to control the vehicle instrument screen to display the traveling information and the backup picture if the video signal outputted to the vehicle instrument screen does not exist.

It can be learned from the foregoing that, in the solutions of the present disclosure, when a display screen is not frozen, a preset pixel in a video signal outputted to the display screen changes based on a preset policy. By monitoring a change of the preset pixel in the video signal, and comparing the change with the preset policy, whether the display screen is currently frozen can be determined. In the solutions of the present disclosure, frozen screen detection can be achieved on the display screen without adding an additional camera, thereby effectively reducing costs.

Corresponding to the frozen screen detection method provided above, an embodiment of the present disclosure further provides an electronic device. The electronic device in this embodiment of the present disclosure includes: a memory, one or more processors, and a computer program stored in the memory and executable on the processor. The memory is configured to store a software program and a unit. The processor executes various function applications and data processing by running the software program and the unit stored in the memory, to implement steps of the foregoing frozen screen detection method. In an embodiment, the processor implements the steps of the foregoing frozen screen detection method by running the computer program stored in the memory.

It should be understood that in the embodiments of the present disclosure, the processor may be a central processing unit (CPU). The processor may further be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor and the like.

The memory may include a ROM and a RAM, and provide instructions and data for the processor. A part or all of the memory may further include a non-volatile random access memory. For example, the memory may further store device type information.

Corresponding to the frozen screen detection method provided above, an embodiment of the present disclosure further provides a vehicle. The vehicle includes the foregoing electronic device. The electronic device is configured to implement the steps of the foregoing frozen screen detection method.

Corresponding to the frozen screen detection method provided above, an embodiment of the present disclosure further provides a computer-readable storage medium. The computer-readable storage medium stores a computer program. The computer program, when executed by a processor, implements the steps of the frozen screen detection method.

A person skilled in the art may clearly understand that, for the purpose of convenient and brief description, only division of the foregoing function units is used as an example for description. In the practical application, the functions may be allocated to and completed by different function modules according to requirements. That is, an internal structure of the device is divided into different functional units or modules, to complete all or some of the functions described above. The function units and modules in the embodiments may be integrated into one processing unit, or each of the units may exist alone physically, or two or more units are integrated into one unit. The integrated unit may be implemented in the form of hardware, or may be implemented in the form of a software function unit. In addition, the names of each function unit and module are only for the purpose of distinguishing each other, and are not used to limit the protection scope of the present disclosure. For work processes of the units and modules in the system, reference may be made to corresponding processes in the foregoing method embodiments, and details are not described herein again.

In the embodiments, descriptions of the embodiments have different emphases. As for parts that are not described in detail in one embodiment, reference can be made to the relevant descriptions of the other embodiments.

A person of ordinary skill in the art may notice that the units and algorithm steps described with reference to the embodiments disclosed in this specification can be implemented in electronic hardware, or a combination of external device software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the present disclosure.

In the embodiments provided in the present disclosure, it should be understood that the disclosed device and method may be implemented in other ways. For example, the described system embodiment is merely examples. For example, the module and unit division is merely logical function division and there may be other division manners during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

When the foregoing integrated unit is implemented in the form of a software function unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file or some intermediate forms, or the like. The computer-readable storage medium may include: any entity or apparatus that is capable of carrying the computer program code, a recording medium, a USB flash drive, a removable hard disk, a magnetic disk, an optical disc, a read-only memory (ROM, Read-Only Memory), a random access memory (RAM, Random Access Memory), an electric carrier signal, a telecommunication signal and a software distribution medium, or the like. It should be noted that the content contained in the computer-readable storage medium may be appropriately increased or decreased according to the requirements of legislation and patent practice in jurisdictions. For example, in some jurisdictions, according to legislation and patent practice, the computer-readable storage medium does not include an electric carrier signal and a telecommunication signal.

The foregoing embodiments are merely for describing the technical solutions of the present disclosure, but not for limiting the present disclosure. Although the present disclosure is described in detail with reference to the foregoing embodiments, it should be understood by a person skilled in the art that, they may still make modifications to the technical solutions described in the foregoing embodiments or make equivalent replacements to some technical features thereof, without departing from the spirit and scope of the technical solutions of the embodiments of the present disclosure, which being included in the protection scope of the present disclosure.

What is claimed is:

1. A method for detecting a frozen screen, comprising:
monitoring a change of a pixel in a video signal outputted to a display screen, comprising: in response to receiving traveling information to be displayed on a vehicle instrument screen, determining whether a video signal outputted to the vehicle instrument screen exists; and in response to that the video signal outputted to the vehicle instrument screen exists, monitoring a change of a pixel in the video signal outputted to the vehicle instrument screen, wherein the pixel changes based on a policy when the display screen is not frozen, and the display screen is the vehicle instrument screen; and
determining whether the display screen is frozen according to the change of the pixel and the policy.

2. The method according to claim 1, wherein the determining, according to the change of the pixel and the policy, whether the display screen is frozen comprises:

determining whether the change of the pixel complies with the policy;

in response to that the change of the pixel complies with the policy, determining that the display screen is not frozen; and in response to that the change of the pixel does not comply with the policy, determining that the display screen is frozen.

3. The method according to claim 2, wherein the policy is that a pixel value of a pixel in a plurality of target frames of the video signal changes, and that the pixel has different pixel values in two adjacent target frames;

the monitoring a change of a pixel in a video signal outputted to a display screen comprises:

monitoring a change of the pixel value of the pixel in the plurality of target frames; and the determining whether the change of the pixel complies with the policy comprises:

determining whether the change of the pixel value of the pixel in the target frames complies with the policy.

4. The method according to claim 3, wherein the monitoring a change of the pixel value of the pixel in the plurality of target frames comprises:

detecting, based on a display order of the target frames, whether a pixel value of the pixel in a current target frame of the target frames of the video signal is the same as a pixel value of the pixel in a preceding target frame of the target frames;

in response to that the pixel value of the pixel in the current target frame of the target frames of the video signal is the same as the pixel value of the pixel in the preceding target frame of the target frames, increasing a count value by one; and in response to that the pixel value of the pixel in the current target frame of the target frames of the video signal and the pixel value of the pixel in the preceding target frame of the target frames are different, resetting the count value to zero; and the determining whether the change of the pixel value of the pixel in the target frames complies with the policy comprises:

determining whether the count value is greater than a count threshold;

in response to that the count value is greater than the count threshold, determining that the change of the pixel value of the pixel in the target frames does not comply with the policy; and in response to that the count value is less than or equal to the count threshold, determining that the change of the pixel value of the pixel in the target frames complies with the policy.

5. The method according to claim 4, wherein the detecting, based on a display order of the target frames, whether a pixel value of the pixel in a current target frame of the target frames of the video signal is the same as a pixel value of the pixel in a preceding target frame of the target frames comprises:

obtaining a cyclic redundancy check code of the pixel in the current target frame based on the display order of the target frames;

in response to that the cyclic redundancy check code of the pixel in the current target frame is the same as a cyclic redundancy check code of the pixel in the preceding target frame, determining that a pixel value of the pixel in the current target frame is the same as the pixel value of the pixel in the preceding target frame; and in response to that the cyclic redundancy check code of the pixel in the current target frame is different from the cyclic redundancy check code of the pixel in the preceding target frame, determining that the pixel value of the pixel in the current target frame is different from the pixel value of the pixel in the preceding target frame.

6. The method according to claim 3, wherein the video signal is a video signal outputted to the display screen in a monitoring period, and each of the target frames is a frame in the video signal, or the target frames are frames sampled in the video signal spaced apart by a certain number of frames, or the target frames are a plurality of consecutive frames in the video signal.

7. The method according to claim 1, wherein the determining, according to the change of the pixel and the policy, whether the display screen is frozen comprises:

determining whether the change of the pixel complies with the policy;

in response to that the change of the pixel complies with the policy, determining that the display screen is not frozen;

in response to that the change of the pixel does not comply with the policy, selecting at least two detection frames from the video signal outputted to the vehicle instrument screen;

determining whether the detection frames are the same;

in response to that the at least two detection frames are the same, determining that the display screen is frozen; and in response to that the at least two detection frames are different, determining that the display screen is not frozen.

8. The method according to claim 1, further comprising:

in response to determining that the display screen is frozen, clearing a residual picture on the display screen, and controlling the display screen to display a backup picture.

9. The method according to claim 1, further comprising:

in response to that the video signal outputted to the vehicle instrument screen does not exist, controlling the vehicle instrument screen to display the traveling information and a backup picture.

10. An electronic device, comprising a memory, a processor, and a computer program stored in the memory and executable on the processor, wherein when the computer program is executed by the processor, the processor is configured to perform operations comprising:

monitoring a change of a pixel in a video signal outputted to a display screen, comprising: in response to receiving traveling information to be displayed on a vehicle instrument screen, determining whether a video signal outputted to the vehicle instrument screen exists; and in response to that the video signal outputted to the vehicle instrument screen exists, monitoring a change of a pixel in the video signal outputted to the vehicle instrument screen, wherein the pixel changes based on a policy when the display screen is not frozen, and the display screen is the vehicle instrument screen; and determining whether the display screen is frozen according to the change of the pixel and the policy.

11. The electronic device according to claim 10, wherein the determining, according to the change of the pixel and the policy, whether the display screen is frozen comprises:

determining whether the change of the pixel complies with the policy;

in response to that the change of the pixel complies with the policy, determining that the display screen is not frozen; and in response to that the change of the pixel does not comply with the policy, determining that the display screen is frozen.

12. The electronic device according to claim 11, wherein the policy is that a pixel value of a pixel in a plurality of target frames of the video signal changes, and that the pixel has different pixel values in two adjacent target frames;

the monitoring a change of a pixel in a video signal outputted to a display screen comprises:

monitoring a change of the pixel value of the pixel in the plurality of target frames; and the determining whether the change of the pixel complies with the policy comprises:

determining whether the change of the pixel value of the pixel in the target frames complies with the policy.

13. The electronic device according to claim 12, wherein the monitoring a change of the pixel value of the pixel in the plurality of target frames comprises:

detecting, based on a display order of the target frames, whether a pixel value of the pixel in a current target frame of the target frames of the video signal is the same as a pixel value of the pixel in a preceding target frame of the target frames;

in response to that the pixel value of the pixel in the current target frame of the target frames of the video signal is the same as the pixel value of the pixel in the preceding target frame of the target frames, increasing a count value by one; and in response to that the pixel value of the pixel in the current target frame of the target frames of the video signal and the pixel value of the pixel in the preceding target frame of the target frames are different, resetting the count value to zero; and the determining whether the change of the pixel value of the pixel in the target frames complies with the policy comprises:

determining whether the count value is greater than a count threshold;

in response to that the count value is greater than the count threshold, determining that the change of the pixel value of the pixel in the target frames does not comply with the policy; and in response to that the count value is less than or equal to the count threshold, determining that the change of the pixel value of the pixel in the target frames complies with the policy.

14. The electronic device according to claim 13, wherein the detecting, based on a display order of the target frames, whether a pixel value of the pixel in a current target frame of the target frames of the video signal is the same as a pixel value of the pixel in a preceding target frame of the target frames comprises:

obtaining a cyclic redundancy check code of the pixel in the current target frame based on the display order of the target frames;

in response to that the cyclic redundancy check code of the pixel in the current target frame is the same as a cyclic redundancy check code of the pixel in the preceding target frame, determining that a pixel value of the pixel in the current target frame is the same as the pixel value of the pixel in the preceding target frame; and in response to that the cyclic redundancy check code of the pixel in the current target frame is different from the cyclic redundancy check code of the pixel in the preceding target frame, determining that the pixel value of the pixel in the current target frame is different from the pixel value of the pixel in the preceding target frame.

15. The electronic device according to claim 12, wherein the video signal is a video signal outputted to the display screen in a monitoring period, and each of the target frames is a frame in the video signal, or the target frames are frames sampled in the video signal spaced apart by a certain number of frames, or the target frames are a plurality of consecutive frames in the video signal.

16. The electronic device according to claim 10, wherein the determining, according to the change of the pixel and the policy, whether the display screen is frozen comprises:

determining whether the change of the pixel complies with the policy;

in response to that the change of the pixel complies with the policy, determining that the display screen is not frozen;

in response to that the change of the pixel does not comply with the policy, selecting at least two detection frames from the video signal outputted to the vehicle instrument screen;

determining whether the detection frames are the same;

in response to that the at least two detection frames are the same, determining that the display screen is frozen; and in response to that the at least two detection frames are different, determining that the display screen is not frozen.

17. The electronic device according to claim 10, wherein the operations further comprise:

in response to determining that the display screen is frozen, clearing a residual picture on the display screen, and controlling the display screen to display a backup picture.

18. A vehicle, comprising an electronic device, wherein the electronic device comprises a memory, a processor, and a computer program stored in the memory and executable on the processor, and the processor is configured to execute the computer program to perform operations comprising:

monitoring a change of a pixel in a video signal outputted to a display screen, comprising: in response to receiving traveling information to be displayed on a vehicle instrument screen, determining whether a video signal outputted to the vehicle instrument screen exists; and in response to that the video signal outputted to the vehicle instrument screen exists, monitoring a change of a pixel in the video signal outputted to the vehicle instrument screen, wherein the pixel changes based on a policy when the display screen is not frozen, and the display screen is the vehicle instrument screen; and determining whether the display screen is frozen according to the change of the pixel and the policy.

19. The vehicle according to claim 18, wherein the determining, according to the change of the pixel and the policy, whether the display screen is frozen comprises:

determining whether the change of the pixel complies with the policy;

in response to that the change of the pixel complies with the policy, determining that the display screen is not frozen; and in response to that the change of the pixel does not comply with the policy, determining that the display screen is frozen.

* * * * *